US007343157B1

(12) United States Patent
Mitchell

(10) Patent No.: US 7,343,157 B1
(45) Date of Patent: Mar. 11, 2008

(54) CELL PHONE AUDIO/VIDEO IN-FLIGHT ENTERTAINMENT SYSTEM

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 156 days.

(21) Appl. No.: 11/151,108

(22) Filed: Jun. 13, 2005

(51) Int. Cl.
*H04Q 7/20* (2006.01)
*H04M 1/725* (2006.01)

(52) U.S. Cl. ............... 455/431; 455/432.1; 455/432.2; 455/12.1; 455/11.1; 455/427; 455/428; 455/436; 725/87; 725/88

(58) Field of Classification Search ............ 370/316, 370/395.52, 329, 332, 333, 341; 455/431, 455/422.1, 12.1, 432.1, 432.2, 427, 428, 455/436; 348/14.01, 61; 725/87, 88
See application file for complete search history.

(56) References Cited

U.S. PATENT DOCUMENTS

| | | | |
|---|---|---|---|
| 6,807,538 B1 * | 10/2004 | Weinberger et al. ........... 707/3 |
| 7,058,401 B1 * | 6/2006 | Sinivaara et al. ............ 455/431 |
| 2002/0168973 A1 * | 11/2002 | Dent et al. .................. 455/427 |
| 2003/0208764 A1 * | 11/2003 | Galipeau et al. .............. 725/76 |
| 2004/0008253 A1 * | 1/2004 | Monrore ...................... 348/143 |
| 2004/0142658 A1 * | 7/2004 | McKenna et al. ......... 455/11.1 |
| 2005/0053026 A1 * | 3/2005 | Mullan et al. ............... 370/316 |
| 2005/0107077 A1 * | 5/2005 | Hintermeier et al. ....... 455/419 |
| 2005/0124337 A9 * | 6/2005 | Gresham et al. ............ 455/431 |
| 2006/0245719 A1 * | 11/2006 | Carroll ........................ 386/46 |

OTHER PUBLICATIONS

"Softswitch Defined", by Charlotte Wolter, Xchange Magazine, May 2000.
US Patent Application for "Protocol Bridge for a Wireless Entertainment Network" by James P. Mitchell, U.S. Appl. No. 11/019,770, filed Dec. 21, 2004.
"Using Your Cell Phone on Airplanes", FCC Consumer Advisory, Jan. 12, 2005.
"FCC to Examine Ban on Using Cellular Telephones on Airborne Aircraft", FCC News, Dec. 15, 2004.
"Personal Cell Phone Use Inflight", AirCell Presentation to the WAEA Technical Committee, Jul. 30, 2002.

(Continued)

*Primary Examiner*—William Trost
*Assistant Examiner*—Julio Perez
(74) *Attorney, Agent, or Firm*—Nathan O. Jensen; Kyle Eppele

(57) ABSTRACT

An airborne cell phone in-flight entertainment (IFE) system uses a cell phone for calls and IFE requests by dialing appropriate numbers. A pico cell receives the calls and the IFE requests. A soft switch switches the calls and IFE requests according to the telephone number. A transceiver receives the calls from the soft switch and sends them to a ground station that directs them to a telephone system. A media server receives IFE requests and provides IFE to the cell phone. A direct broadcast satellite (DBS) receiver on the aircraft receives DBS signals. A transcoder converts the received DBS signals from one compressed video format to another. A broad-to-connection protocol conversion process receives converted format DBS signals and converts them to video content blocks, stores the video content blocks to a continuously updated buffer and presents them to the media server and then to the cell phone.

33 Claims, 4 Drawing Sheets

OTHER PUBLICATIONS

"Verizon Sends TV to 3G Phones", Stephen Lawson, PC World, Jan. 7, 2005.
"3G Phone Brings Streaming Video to Life", Gary Krakow, MSNBC, Jan. 8, 2005.

Co-pending Patent Application entitled "Global Cell Phone System And Method For Aircraft" by James P. Mitchell, being filed on the same day.

* cited by examiner

CELL PHONE AUDIO/VIDEO IN-FLIGHT ENTERTAINMENT SYSTEM

CROSS REFERENCE TO RELATED APPLICATIONS

The present application is related to application Ser. No. 11/151,090 filed herewith entitled "Global Cell Phone System and Method for Aircraft" by James P. Mitchell. The present application is related to co-pending applications Ser. No. 11/019,770 entitled "Protocol Bridge for a Wireless Entertainment Network" by James P. Mitchell filed on Dec. 21, 2004. The co-filed and co-pending applications are incorporated by reference and are assigned to the assignee of the present invention.

BACKGROUND OF THE INVENTION

The present invention relates to an in-flight entertainment (IFE) system, cellular telephone communications systems and specifically to an airborne cellular telephone communications system that is also used for IFE purposes to deliver programming to passengers.

Use of cellular telephones and other wireless data devices on board aircraft has been banned by the Federal Communications Commission (FFC) and restricted by the Federal Aviation Administration (FAA). The FCC ban is in place to avoid interference with terrestrial cellular systems while an aircraft flies over a cellular network. The FAS regulations restrict the use of cell phones on an aircraft to ensure against interference to onboard communications and navigation equipment. The FCC recently has announced that it is going examine relaxing its ban on cell phone use in aircraft. A relaxation in the FCC rules will still be subject to the rules and policies of the FAA and aircraft operators.

The FCC is proposing to permit airborne use of cell phone and other wireless devices at the devices lowest power settings under control of a pico cell located on the aircraft and only if such operation does not interfere with terrestrial cellular systems. In small cell phone networks pico cells are the smallest of radio cells. Pico cells often extend to just a few hundred meters in diameter in ground applications. Pico cells are used to fill in poor coverage areas or to augment larger micro cells or macro cells. On board an aircraft a cell phone user makes a call that goes to the pico cell. The pico cell then communicates from the aircraft to a ground station or to a satellite and from the satellite to a ground station and to finally connect to a public switched telephone network (PSTN).

The current state of the industry includes several cabin system integrators in the process of building and demonstrating pico cells on board aircraft including Honeywell, ARINC, Lufthansa, Air Cell, On Air and others.

Another problem that needs to be addressed in implementing an airborne pico cell system is the wide variety of cell phone models for the many different cell phone standards in use world wide. A passenger must be able to board an aircraft with the pico cell system and use his or her cell phone regardless of the model or type.

In-flight entertainment systems have been installed on commercial airliners for a number of years. An in-flight entertainment system typically comprises the components necessary to present entertainment, voice, data content to airline passengers and crew while in flight. Current IFE systems are wired systems that deliver programming to passengers similar to a cable television system. The current systems comprise head end equipment where programming and control functions originate, a distribution subsystem and display systems located at each passenger or crew seat. The entertainment content is distributed from the head end equipment to passengers by means of the distribution system. The display system receives the content from the distribution system, processes the content and displays it to the airline passengers.

Current IFE systems are best installed as an aircraft is being built. Existing aircraft may have retrofit systems installed. However retrofitting an existing aircraft with new wiring and cables is difficult and expensive. In addition wired systems are heavy due to the amount of wiring required to connect all the seats in an aircraft, comprise a large number of line replaceable units (LRU) such as distribution box equipment and seat equipment, and consume large amounts of power due to the large number of LRUs. Having a large number of LRUs also reduces reliability and increases cost.

Wireless IFE distribution systems offer many advantages over wired systems in an aircraft cabin. Retrofit installations on existing aircraft are much easier to accomplish due to the elimination of wires and cables. Finding locations for the many LRUs such as seat equipment is not required in a wireless system. Weight and power reductions are easily achievable with a wireless distribution system. Fewer LRUs result in less maintenance, more flexibility in IFE system installations, increased reliability, and reduced costs.

An aircraft presents a unique problem to serving video to cell phones not found with current commercial approaches. There is an expectation that one can view video for indefinite periods. Today's cell phones are not capable of continuously streamed video using the cellular infrastructure. Also there are issues with maintaining high enough quality of service over wireless links to support streaming video. There is also an expectation that one should be able to use audio services without competing with cabin noise sources.

Verizon recently released its V-Cast cell phone video service that can deliver high-quality video, however the service requires buffering time for each video clip. No continuous video streaming option is available.

Japan and other countries are producing cell phones that receive digital video via a separate integrated receiver. However this design does not serve the US due to differences in broadcast modulation technology.

A system using the proposed aircraft cabin pico cells and passenger cell phones is needed to provide a low-cost IFE system in contrast to current wired network solutions. The system must be able to function with the many models and types of cell phones in use. What also is needed in the system is a buffer that takes a live video stream and formats it for delivery to a cell phone.

SUMMARY OF THE INVENTION

An airborne cell phone audio/video in-flight entertainment (IFE) system is disclosed. The system comprises a cell phone for making a telephone call or an IFE request by dialing appropriate telephone numbers. A plurality of cell phones may be used in the system. A pico cell receives the telephone call and the IFE request from the cell phone. A soft switch switches the telephone call and the IFE request according to the appropriate telephone number. A transceiver receives the telephone call from the soft switch and sends the telephone call. A ground station receives the telephone call from the transceiver and directs the telephone call it to a telephone system service provider to complete the telephone call. A media server receives the IFE request and provides IFE to the cell phone through the soft switch and the pico cell. A satellite may be used to receive the telephone call from the transceiver and send it to the ground station.

The system may also comprise a direct broadcast satellite (DBS) for transmitting DBS signals and a DBS receiver for receiving the DBS signals. A transcoder connected to the DBS receiver converts the received DBS signals from one compressed video format to another. A broadcast-to-connection protocol conversion buffer receives converted format DBS signals and converts converted format DBS signals to video content blocks, stores the video content blocks and provides the video content blocks to the media server for connection-based deliver to the cell phones. The media server provides the video content blocks to the cell phone.

The media server provides stored IFE programming selected from the entertainment menu by a passenger at a cell phone. The media server accepts a call from the cell phone through the soft switch and provides an entertainment menu and travel information that is driven and updated by an aircraft position location system.

The media server uses a setup process to provide decoding and encoding of media between various cell phone formats. With this setup process the cell phone dials into the media server and selects performance parameters on a media server's website. The media server queries the cell phone for technical information including display format, protocol, and bandwidth requirements. The media server may determine cell phone capability by manual key-in entry on a cell phone key pad through a menu. The media server may automatically determine cell phone capability either directly from a cell phone protocol, control word, or inferenced automatically from a numerical identification of the cell phone where the numerical identification such as an electronic serial number is cross referenced to a model or cell phone type. The media server transcodes a video format from available video options to match the cell phone with different screen aspect ratios, frame rates, protocols, video players and a required data rate. The request results in a unique individually buffered video stream for the cell phone delivered from the media server.

When the cell phone initiates a call the media server performs an algorithm to detect quality of service (QoS) needs and directs the call through an appropriate available air-to-ground or SATCOM system according to a best match to the QoS needs of the cell phone.

It is an object of the present invention to provide a low cost, cell phone pico cell-based, in-flight entertainment system.

It is an object of the present invention to provide high quality and best effort audio and video programming and cell phone connectivity in an aircraft to passengers using cell phones.

It is an advantage of the present invention to provide an in-flight entertainment system that uses passenger carry-on cell phones.

It is an advantage of the present invention to provide an IFE system that is easily installed in an existing aircraft.

It is a feature of the present invention to offer a strategic opportunity to uniquely bring together most cell phone technology, in-flight entertainment server systems, and global satellite choices.

It is a feature of the present invention to be compatible with current third generation and future cell phone data exchange standards.

It is a feature of the present invention to be compatible with future generation protocols and video delivery methods including best effort unicast and broadcast methods.

BRIEF DESCRIPTION OF THE DRAWINGS

The invention may be more fully understood by reading the following description of the preferred embodiments of the invention in conjunction with the appended drawings wherein.

DETAILED DESCRIPTION

The invention described herein is for an aircraft in-flight entertainment system using a cabin cell phone pico cell and passenger provided cell phones to access audio/video content on the aircraft as well as for air-to-ground telephone use.

Figure 1:
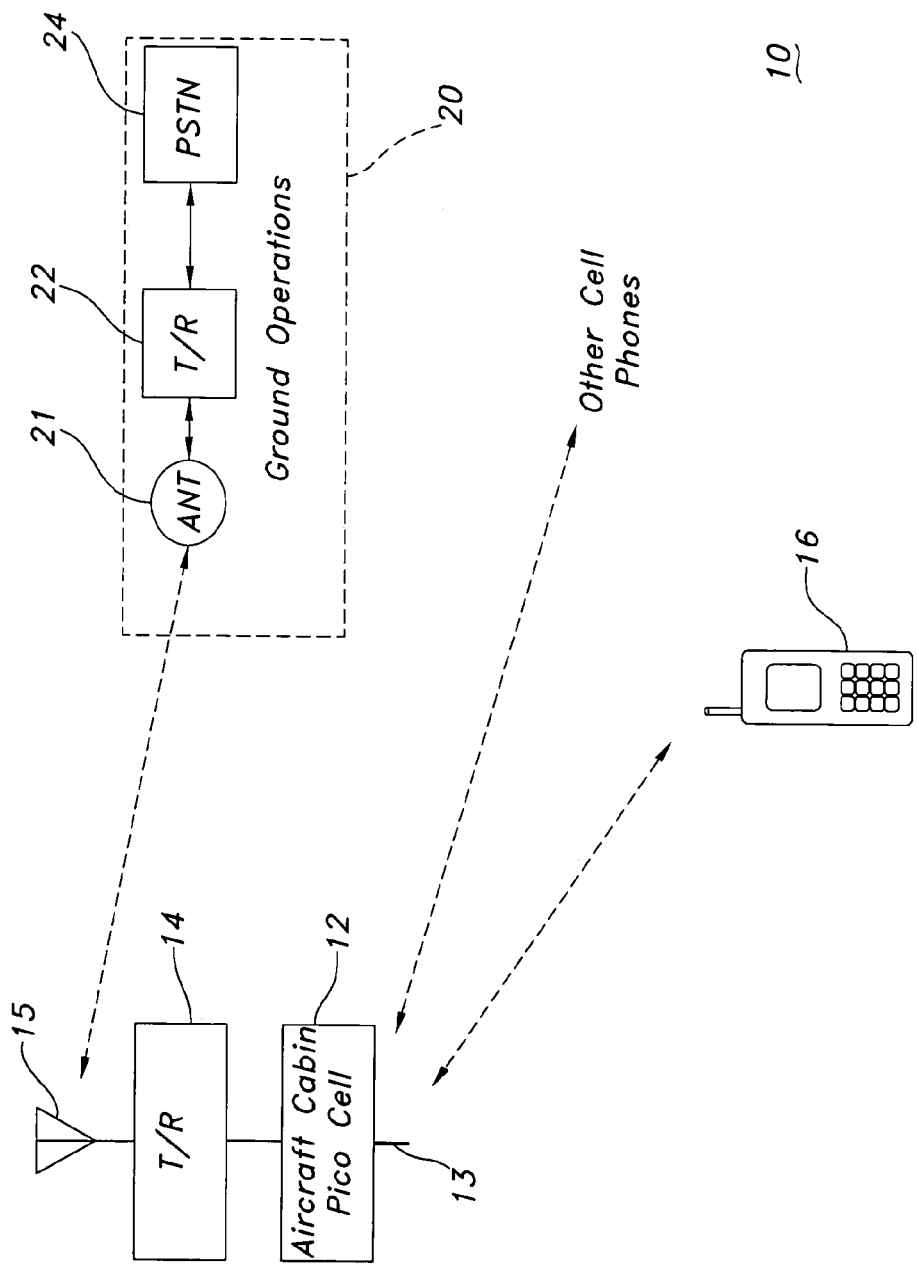
FIG. 1 is a block diagram of an approach under consideration to implement an airborne cellular network using a cabin pico cell.

FIG. 1 shows an approach under consideration for approval by the FCC and being planned by several suppliers to implement an airborne cellular network 10. An aircraft cabin pico cell 12 is used in an aircraft to provide an interface for a passenger cell phone 16 over an air-to-ground link to a cellular ground operations center 20. The system 10 support many cell phones 16. The pico cell 12 provides the functionality of a terrestrial cell and may function with CDMA, GSM, UMTS or other cell phone protocols and may be used for voice or data communications. A passenger places a call on the cell phone 16 that is received by pico cell antenna 13, processed by the pico cell 12 and sent to a transceiver 14 and then to an aircraft antenna 15 for transmission to the cellular ground operations center 20. At the ground operations center 20, the call is received by a ground antenna 21, passed to a ground transceiver 22 and then connected to a public switched telephone network (PSTN) 24. Calls originating on the ground from the PSTN 24 follow a reverse path. Using this approach the power controlled low-power cell phone 16 avoids interference with terrestrial cellular telephone networks. The air-to-ground radio link may also be a satellite link that operates a frequencies that do not interfere with terrestrial cellular networks.

Figure 2:
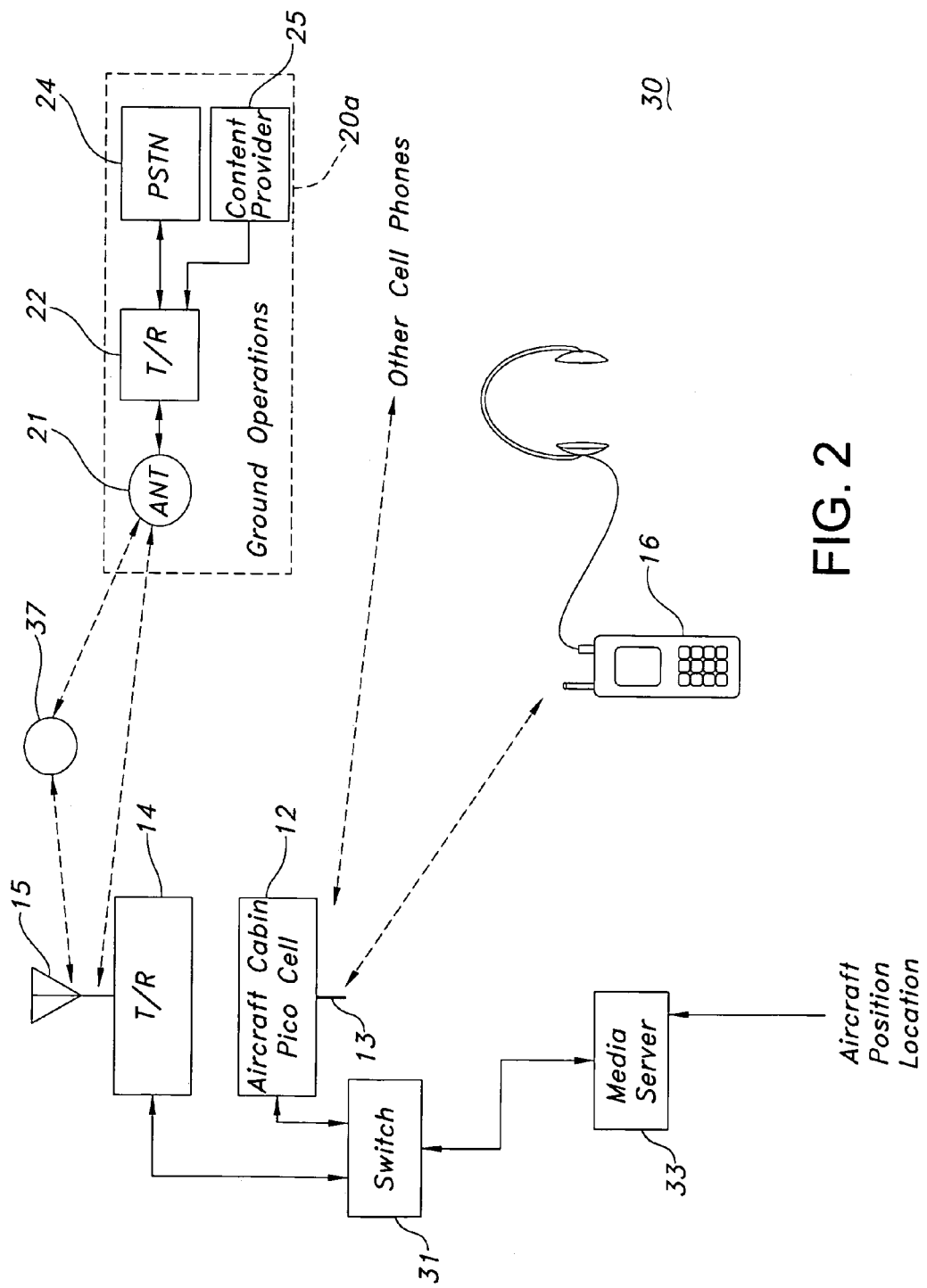
FIG. 2 is a block diagram of the airborne cellular network of FIG. 1 modified into a cell phone audio/video in-flight entertainment (IFE) system of the present invention.

The airborne cellular network 10 of FIG. 1 is modified into a basic cell phone audio/video in-flight entertainment (IFE) system 30 of the present invention as shown in FIG. 2. The system 30 is used for airborne cellular phone calls for voice and data communications as described above and for delivering audio and video-on-demand IFE programming to passengers with cell phones 16. The cell phones 16 may also include such other devices as lap top computers (not shown) with wireless cellular transceiver cards and still be within the scope of the present invention.

Each passenger may receive independent content on their cell phone 16. On board the aircraft the aircraft cabin pico cell 12 and pico cell antenna 13 of FIG. 1 are utilized. A unique soft switch 31 selects between the pico cell 12 between an on-aircraft network media server 33 and the transceiver 14. The soft switch 31 directs calls to connect to either the off-aircraft RF link using transceiver 14 or to the media server 33 to directly accept and provide media selections and accept control without the need for an external IFE system.

The transceiver 14 may communicate through the antenna 15 to a ground operations center 20a directly as before or though a satellite 37 in a SATCOM system. The ground operations center 20a may include a content provider 25 for providing programming to the aircraft. The audio/video programming delivered to the passenger cell phone 16 may originate in the media server 33 or come through the satellite 37 from the content provider 25 such as XM or Sirius Radio or a direct broadcast system (DBS) TV.

In operation of the system 30 in FIG. 2, a passenger carries on a cell phone 16 that is used as a terminal for enabling wireless access to the cabin cell phone pico cell 12 and to access the media server 33 using phone number addresses. The passenger places a call or a connection request to the media server 33 and the media server 33 delivers an entertainment menu with audio titles and listening content. The passenger makes a selection from the menu and requests the IFE programming. A pair of headphones 34 may be provided to the passenger for use with cell phone 16 so as not to disturb other passengers.

The media server 33 accepts the call or connection request from the cell phone 16 directed by the soft switch 31 and establishes a session with the client cell phone 16, providing the entertainment menu and such information as travel advice, weather, hotel selection options, etc. that may be driven and updated by an aircraft position location system such as GPS, without the need for the client cell phone 16 to contact a ground Internet service provider (ISP).

The cell phone 16 may also be used to access the pico cell 12 and in turn connect to the media server 33 for viewing video-on-demand using video and audio streaming capabilities of the cell phone 16. The video programming may originate from the media server 33 to deliver low bit rate video-on-demand to the cell phone 16 from stored video sources within the media server 33.

Technology trends are constantly showing improvements in video CODECS and cell phone bandwidth. Industry predictions show next generation cell phone technology as supporting good quality video. This will become an option for future video entertainment where there are few options today. The client cell phone 16 may be used as a RF cabin link to the pico cell 12, the pico cell 12 in turn is networked to the common media server 33 for offering either TCP (transport control protocol) or streaming UDP (user datagram protocol) video content to the client cell phone 16.

Figure 3:
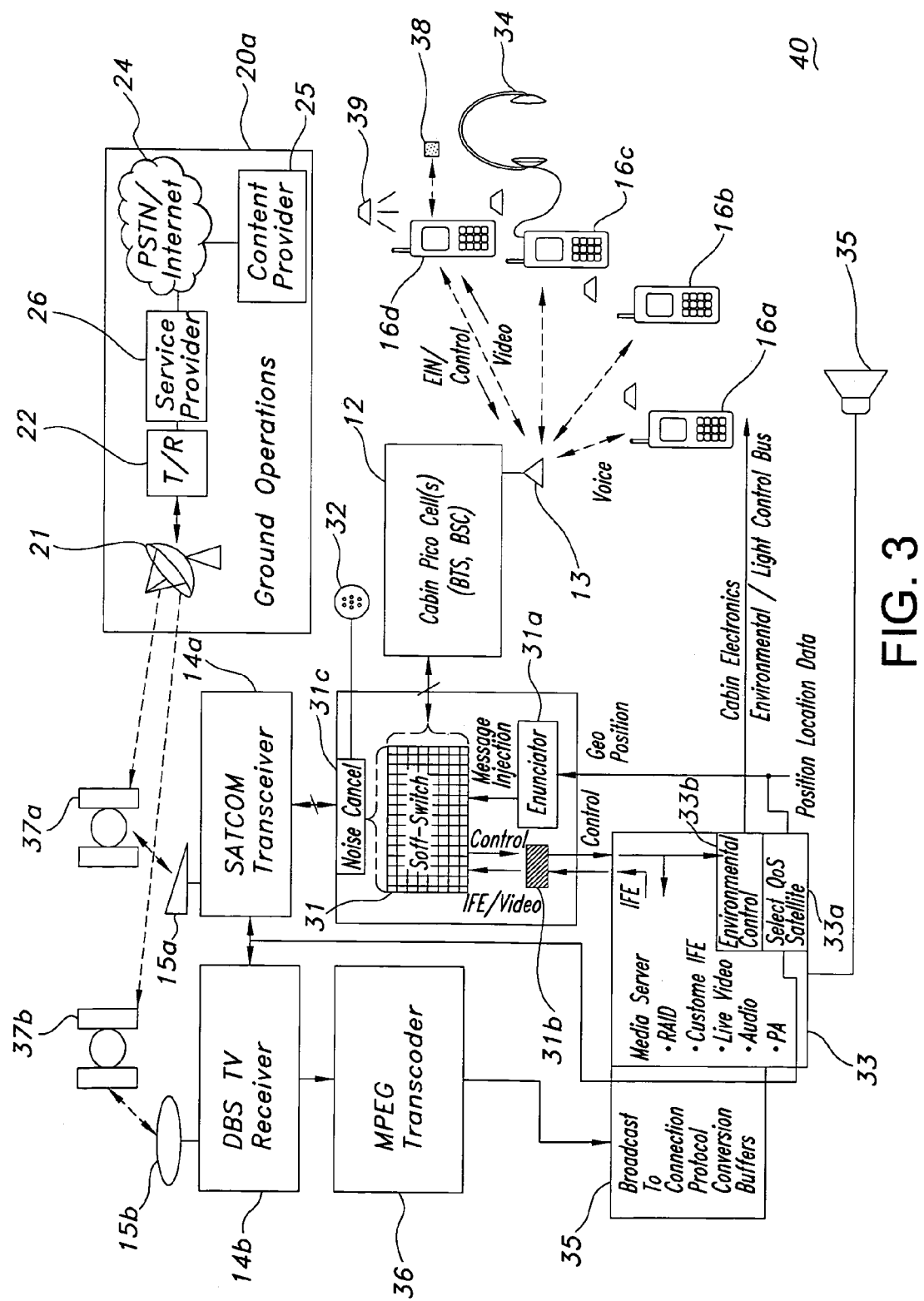
FIG. 3 shows a voice/data and live TV embodiment of the present invention.

FIG. 3 shows a satellite voice/data and live TV system 40 embodiment of the present invention. A SATCOM satellite 37a is used for voice and data communication between the ground and the aircraft and a direct broadcast satellite (DBS) TV satellite 37b is used for delivering live TV in-flight entertainment to the aircraft. The satellite 37b may be a DBS satellite such as DirecTV or Dish Network with the ground operations 20a providing DBS programming from the content provider 25. In the live TV system 40, passengers are conveniently provided a telephone number with which they can optionally dial directly into the aircraft media server 33 to watch live TV and listen with the headset 34 or may optionally telephone a ground number. Server telephone numbers may be placed in in-flight magazines or on seat back card. A plurality of cell phones 16a, 16b, 16c, 16d and others not shown may be used for live TV, movies, audio, games, and other IFE as well as for telephone calls for voice and data communications with the ground.

Calls from the plurality of cell phones 16a-d are made to one or more cabin pico cells 12 that have antennas 13. The pico cells 12 may be distributed throughout the aircraft cabin to provide coverage to all cell phones 16 in all passenger seats. Calls from the pico cells 12 are directed to a SATCOM transceiver 14a, or the direct air-to ground transceiver of FIG. 2 or to the onboard media server 33 by the soft switch 31 as determined by the passenger's choice of service and number called. The SATCOM transceiver 14a is used in place of the transceiver 14.

The soft switch 31 is a unique system that can deliver packet or streaming data and establishes network connections according to off-board or on-board aircraft needs such as demand for an off-board telephony link or on-board media entertainment from the media server 33. The soft switch 31 may be implemented as a standard computing platform running switching software or as hardware switch. It is noted, that while the term soft switch is commonly used in industry and in this description, the component can be incorporated into another system and labeled differently, e.g. such as a media server with a switch, or other system performing the functions specified.

The soft switch 31 has the ability to scan and filter certain transported data to and from the cell phones 16. The soft switch 31 is also in a unique system position to directly monitor/inject data and data streams to and from cell phones 16 using enunciator 31a. Injected audio or video messages may include advanced warning to the passengers or crew that the plane will be landing soon. These messages are stored within the soft switch 31 and injected directly as a priority into a passenger audio/video stream. The message may be triggered or enabled by a position location data signal. Soft switch priority messages may also include the enunciator 31a telling the passengers or crew the status of the satellite links.

The soft switch 31 may also regulate data flow rate between the media server 33 and cell phones 16 through interface 31b to avoid favoring one or more clients over others that are sharing the network 40. Data throughout is therefore kept at a stable rate to all cell phones 16 thereby avoiding video or audio CODEC starvation at any cell phone 16.

The soft switch 31 may also intercept and scan each packet from the cell phone packet transport to identify unique control words that may be used to directly control the media server 33 through interface 31b. For example, the "up-arrow" control word on the cell phone's keyboard may be detected directly by a soft switch algorithm (while scanning for codes) during it's otherwise normal switch routine. These control codes may be interpreted by an algorithm embedded within the soft switch 31 and used to control the cell phone's media stream such as switching the source to a new satellite channel or selecting a new video from a list of recorded videos. Each aircraft passenger client with his/her cell phone 16 has the capability to independently request a unique video—e.g. video-on-demand (VoD).

Messages delivered or injected by the soft switch 31 have very low latency, therefore the passenger does not hear an undesirable echo when the flight attendant makes an announcement. Passengers hear low-latency messages with their headsets 34 and also through the headsets 34 they can hear a public address (PA) message over PA speaker 35 in phase with the audio from the headset as interrupted audio.

A noise cancellation process may be used with the soft switch 31 that includes continuous measurement of cabin noise by a noise sensor 32. A noise cancellation algorithm 31c uses the noise sensor 32 output to reduce noise of the digital output from the soft switch 31 to the SATCOM transceiver 14a by using phase cancellation. Soft switch 31 and pico cell 12 inherently introduce latency in the audio, uniquely enabling the application of a noise cancellation process without adding additional latency.

A cell phone 16d becomes a terminal for passenger control without interfering with other passenger seats by using position location identification obtained from manual entry on the cell phone keypad, use of a passenger ticket number, or use of a short range RFID tag 38 (See FIG. 3) embedded near or in the seat. The passenger seat area has miniature short range RF tags (e.g. 20 cm RF range) that may be actively or passively excited by the cell phones 16 placed within their proximity. The RF tag data may also be received by the cell phone 16d and supplied to the soft switch 31 and sent to the media server 33 for processing lighting and environment control commands with algorithm 33b from the cell phone 16d to a specific aircraft seat enabling control of a light 39.

Calls from the SATCOM transceiver 14a and antenna 15a go through the SATCOM satellite 37a to the ground operations center 20a where the calls are received by the antenna 21 and ground transceiver 22 and sent to the PSTN 24 through a service provider 26. The SATCOM transceiver 14a and SATCOM satellite may be part of a low earth orbit (LEO) satellite system such as Iridium or a geosynchronous earth orbit (GEO) satellite system such as Boeing's Connexion Ku and/or Ka band satellite. Two or more SATCOM transceiver systems may be provided for operation with two or more different SATCOM systems.

A position location data interface, such as ARINC 429 or GPS in FIG. 3, provides the soft switch 31 position data enabling the system 40 to monitor satellite availability and to initiate system receiver and antenna handoff control.

Calls that request in-flight entertainment from the passenger go to the media server 33 from which stored or live entertainment is provided. The entertainment may be stored on RAID (redundant array of independent discs) discs and may be audio, games, or video stored thereon. Live audio may come from an XM or Sirius satellite receiver (not shown).

Live TV may come from DirecTV, Dish Network, SES Astra, hybrid Ka/Ku systems, or others from the content provider 25 in the ground operations center 20a over the DBS satellite 37b to a DBS antenna 15b and DBS TV receiver 14b onboard the aircraft. The output of the DBS satellite receiver 14b may be MPEG-2 compressed video that is converted to MPEG-4 compressed video in MPEG transcoder 36 to obtain a lower bit rate video signal. MPEG transcoders 36 are known in the art and are commercially available. The MPEG-4 video is sent to broadcast-to-connection protocol conversion buffers 35 here the video is converted from streaming video to video blocks that are temporarily stored before being supplied when needed to the media server 33 and finally to the cell phones 16a-d.

U.S. Patent Application for "Protocol Bridge for a Wireless Entertainment Network" by James P. Mitchell Attorney Docket No. 04CR104/KE Ser. No. 11/019,770 filed on Dec. 21, 2004 and assigned to the assignee of the present invention and incorporated by reference is for a broadcast-to-connection protocol conversion buffer 35. The video content processing buffer disclosed in the co-pending application provides streaming video content to the cell phones 16 and includes a video content buffer system configured to receive streaming video and store the receive streaming video as video content blocks. A video content processing engine provides video content blocks to the cell phones 16.

The system 40 of the present invention has an important feature for solving video format compatibility issues as well as solving performance issues relating to the use of different cell phone technologies in one system. This will become a greater issue with time as cell phone manufacturers and network service providers expand into their own directions to differentiate and remain competitive.

A unique function associated with the media server 33 is that it provides all necessary decoding and encoding of media between various cell phone formats. This function is a generic system level operative and includes current, planned and future, standards and interfaces for audio and video including but not limited to analog, PCM, MPEG-X, H.324, H.263, G.723, V.80, H.3xx video teleconferencing, and others including standards formulated by the WAEA (World Airline Entertainment Association) content group.

Before launching a video stream, a setup process is automatically provided or initiated where a client cell phone 16 dials into the media server 33 and selects performance parameters on a media server's website. The setup process with the media server 33, results in a technical information query of the cell phone 16. Information including display format, protocol, and bandwidth requirements may be exchanged for the purpose of providing an optimal video experience. This setup process to determine a passenger's cell phone capability may be done by manual key-in entry through a menu from the cell phone key pad and decoded at the media server 33. The setup process may also be automatic if allowed by the cell phone 16 either directly from the cell phone protocol, control word, or inferenced automatically from an electronic serial number (ESN) or mobile serial number (MSN) identification of the phone where the number is cross referenced to a model or phone type. The media server 33 then generates an acceptable video format to correctly match various phones with different screen aspect ratios (16×9, 5×4, etc), frame creates, video players and required data rate.

A request for video then results in unique individually buffered video streams for each client cell phone 16a-d and is delivered through the soft switch 31 located between the video media server 33 and the pico cell 12. The system 40 accepts MPEG satellite video from the external Ku-band antenna 15b and produces the required number of individual buffers uniquely prepared for each client's unique cell phone 16a-d and application needs ad determined in the setup process. From start to finish the video content has been transformed from a broadcast or UDP format, to a TCP format for each cell phone 16a-d attached to the wireless pico cell system 12.

Cell phones 16 today are just beginning to enable high-speed data usage. The future will have even faster data needs with 2.5 and 3G phone data needs already requiring 80 kbps to greater than 1 Mbps. This far surpasses current aircraft voice and data telephony capability. Existing SATCOM telephony systems (Iridium, Inmarsat, Globalstar, NATS-2 etc.) are not yet capable of meeting high performance needs for carrying data from the 3 G data enabled cell phones. This issue is compounded when multiplied by airplanes of users in a region of having multiple airplanes. Furthermore current services simply are not economical to the average consumer.

With the system 40 of the present invention, when a cell phone 16 or other wireless device on board the aircraft initiates a call, an algorithm 33a that can be performed by media server 33, detects phone quality of service (QoS) needs and directs the call through an appropriate available air-to-ground or SATCOM system according to a best match to the QoS needs of that user and aircraft position location from the position location input shown in FIG. 3.

Figure 4:
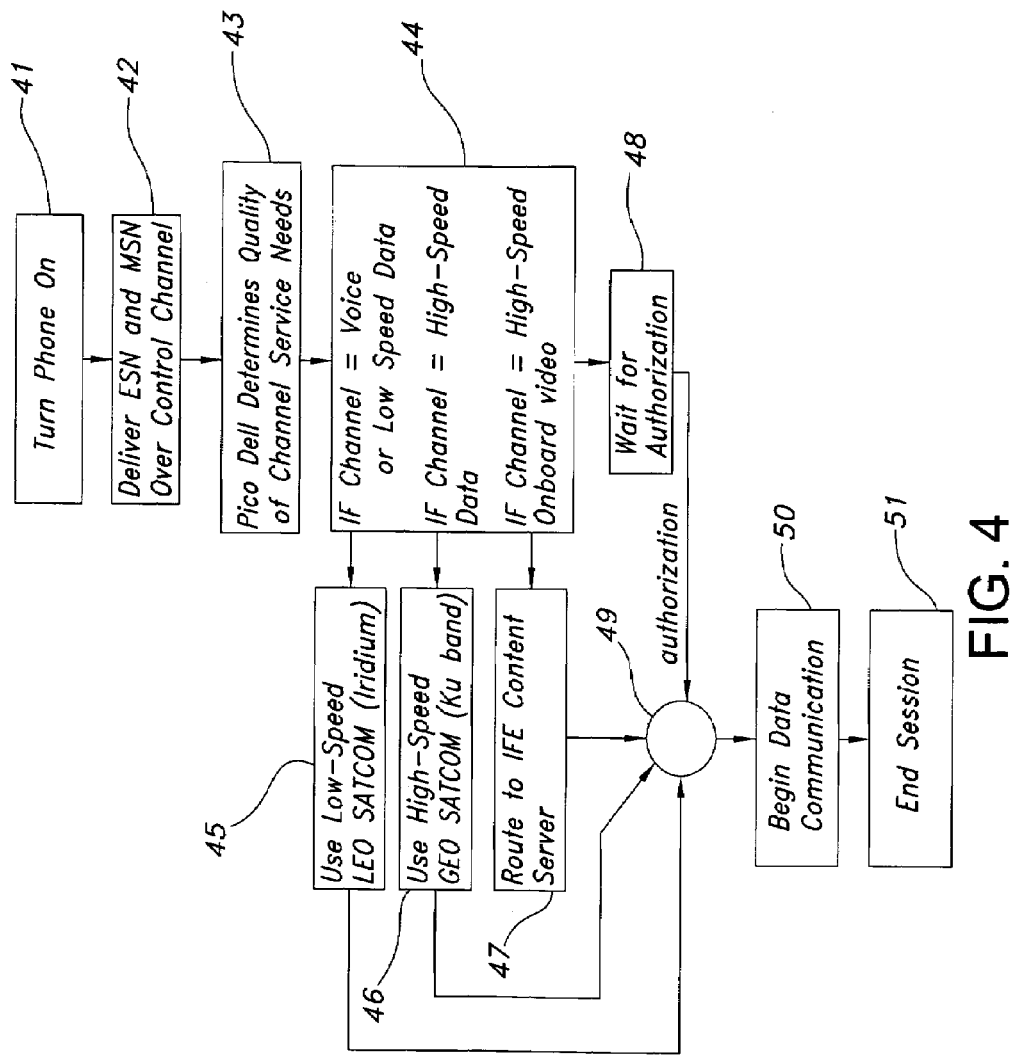
FIG. 4 is a flow chart depicting a quality of service process operation of the present invention.

A flow chart depicting QoS process operation is shown in FIG. 4. The cell phone 16 is turned on and a call is made at step 41 and QoS process is started. At step 42 the ESN or MSN are delivered over a cellular system control channel. At step 43 the pico cell determines quality of service (QoS) needs from a QoS indicator from the cell phone 16. If a voice call is needed at step 44, the QoS indicator goes into an algorithm that directs the call to a low earth orbit (LEO) system such as Iridium as indicated by step 45. Since voice is the only need, 2.4 kbps is sufficient as provided by the Iridium system. Alternatively at step 44 if the user has a 3G data phone and wishes to send a graphics attachment that requires high speed data, the QoS algorithms detects the type of service needed and directs the call through a geosynchronous earth orbit (GEO) satellite such as a two-way Ka or Ku band satellite (step 46). If the user requests a movie from the media server 33 at step 44, the user request is routed to the media server 33 for stored movies, Internet, or satellite video at step 47. At step 48 authorization is waited for. Step 49 enables the selected service from step 45, 46, or 46 when authorization is received. At step 50 data communications begis until completion at step 51, end of session.

It is believed that the cell phone audio/video in-flight entertainment system of the present invention and may of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An airborne cell phone audio/video in-flight entertainment (IFE) system comprising:
   a cell phone for making a telephone call and an IFE programming request by dialing an appropriate telephone number;
   a pico cell for receiving the telephone call and the IFE programming request from the cell phone;
   a soft switch connected to the pico cell and for switching the telephone call and the IFE programming request according to the appropriate telephone number;
   a transceiver connected to the soft switch and for receiving the telephone call and sending the telephone call;
   a ground station for receiving the telephone call from the transceiver and directing the telephone call to a telephone system to complete the telephone call; and
   a media server connected to the soft switch and for receiving the IFE programming request and providing IFE programming to the cell phone through the soft switch and the pico cell,
   wherein the media server accepts a call from the cell phone through the soft switch and provides an entertainment menu and travel information that is driven and updated by aircraft position location data.

2. The system of claim 1 further comprising a satellite for receiving the telephone call from the transceiver and sending the telephone call to the ground station.

3. The system of claim 1 further comprising:
   a direct broadcast (DBS) for transmitting DBS signals;
   a DBS receiver for receiving the DBS signals;
   a transcoder connected to the DBS receiver and for converting the received DBS signals from one compressed video format to another; and
   a broadcast-to-connection protocol conversion to buffer to receive converted format DBS signals and convert converted format DBS signals to video content blocks, to store the video content blocks and provide the video content blocks to the media server; and
   the media server to provide the video content blocks to the cell phone.

4. The system of claim 1 wherein the media server provides stored IFE programming selected from an entertainment menu.

5. The system of claim 1 wherein when the cell phone initiates a call the media server performs an algorithm to detect quality of service (QoS) needs and directs the call through an appropriate available air-to-ground or SATCOM system according to a best match to the QoS needs of the cell phone and current aircraft position location.

6. The system of claim 1 wherein a position of the cell phone is identified by using position location identification obtain from one of manual entry on the cell phone keypad, passenger ticket number, and a short range RFID tag embedded near or in the seat.

7. An airborne cell phone audio/video in-flight entertainment (IFE) system comprising:
   a cell phone for making a telephone call and an IFE programming request by dialing an appropriate telephone number;
   a pico cell for receiving the telephone call and the IFE programming request from the cell phone;
   a soft switch connected to the pico cell and for switching the telephone call and the IFE programming request according to the appropriate telephone number;
   a transceiver connected to the soft switch and for receiving the telephone call and sending the telephone call;
   a ground station for receiving the telephone call from the transceiver and directing the telephone call to a telephone system to complete the telephone call; and
   a media server connected to the soft switch and for receiving the IFE programming request and providing IFE programming to the cell phone through the soft switch and the pico cell,
   wherein the media server uses a setup process to provide decoding and encoding of media between various cell phone formats.

8. The system of claim 7 wherein the cell phone dials into the media server and selects performance parameters.

9. The system of claim 7 wherein the media server queries the cell phone for display format, protocol, and bandwidth requirements.

10. The system of claim 9 wherein the media server determines a cell phone capability by manual key-in entry on a cell phone key pad through a menu.

11. The system of claim 9 wherein the media server automatically determines cell phone capability either directly from a cell phone protocol, control word, or inference automatically from a numerical identification of the cell phone wherein the numerical identification is cross referenced to a model or cell phone type.

12. The system of claim 9 wherein the media server generates a media format to match the cell phone with display format, video players and bandwidth requirements.

13. A method of providing in-flight entertainment (IFE) and cell phone communications with an airborne cell phone audio/video in-flight entertainment (IFE) system comprising the steps of:
   dialing appropriate telephone numbers with a cell phone to make a telephone call and an IFE programming request;
   receiving the telephone call and the IFE programming request from the cell phone with a pico cell;

switching the telephone call and the IFE programming request according to the appropriate telephone number with a soft switch;

receiving the telephone call from the soft switch and sending the telephone call with a transceiver to a ground station;

receiving the telephone call from the transceiver at the ground station and sending the telephone call to a telephone system to complete the telephone call; and receiving the IFE programming request and providing IFE programming to the cell phone with a media server, wherein the media server performs the steps of:

accepting a call from the cell phone through the soft switch; and providing an entertainment menu and travel information that is driven and updated by an aircraft position location system.

14. The method of claim 13 further comprising the steps of:

transmitting DBS signals with a direct broadcast satellite (DBS);

receiving the DBS signals with a DBS receiver;

converting the received DBS signals from one compressed video format to another with a transcoder connected to the DBS receiver;

receiving converted format DBS signal with a broadcast-to-connection protocol conversion buffer;

converting converted format DBS signals to video content blocks;

storing the video content blocks and provide the video content blocks to the media server; and providing the video content blocks to the cell phone the media server.

15. The method of claim 13 wherein the passenger cell phone obtains position location identification by performing one of the steps of manually entering on the cell phone keypad a passenger ticket number and using a short range RFID tag embedded near or in the seat.

16. The method of claim 13 further comprising the step of providing stored IFE programming selected from an entertainment menu from the media server.

17. The method of claim 13 further comprising the steps of:

initiating a call with the cell phone:

performing an algorithm in the media server to detect quality of service (QoS) needs; and directing the call through an appropriate available air-to-ground or SATCOM system according to a best match to the QoS needs of the cell phone.

18. The method of claim 13 further comprising the steps of:

initiating a call with the cell phone;

delivering an electronic serial number over a control channel;

determining with the pico cell quality of service (QoS) needs from a QoS indicator from the cell phone;

directing the call to a low earth orbit satellite system if a voice call is needed;

directing the call to a geosynchronous earth orbit satellite if high speed data is needed;

directing the call to the media server for stored video if video is requested;

waiting for authorization;

enabling a selected service when authorization is received;

beginning data communications; and completing data communications.

19. A method of providing in-flight entertainment (IFE) and cell phone communications with an airborne cell phone audio/video in-flight entertainment (IFE) system comprising the steps of:

dialing appropriate telephone numbers with a cell phone a make a telephone call and an IFE programming request;

receiving the telephone call and the IFE programming request from the cell phone with a pico cell;

switching the telephone call and the IFE programming request according to the appropriate telephone number with a soft switch;

receiving the telephone call from the soft switch and sending the telephone call with a transceiver to a ground station;

receiving the telephone call from the transceiver at the ground station and sending the telephone call to a telephone system to complete the telephone call; and receiving the IFE programming request and providing IFE programming to the cell phone with a media server, wherein the media server performs the step of decoding and encoding of media between various cell phone formats using a setup process.

20. The method of claim 19 wherein the cell phone performs the steps of:

dialing into the media server; and selecting performance parameters on a media server's website.

21. The method of claim 19 wherein the media server performs the step of querying the cell phone for display format, protocol, and bandwidth requirements.

22. The method of claim 21 wherein the media server performs the step of determining a cell phone capability through manual key-in entry on a cell phone key pad through a menu.

23. The method of claim 21 wherein the media server performs the step of automatically determining cell phone capability from a cell phone protocol, control word, or inferencing automatically from a numerical identification of the cell phone wherein the numerical identification is cross referenced to a model or cell phone type.

24. The method of claim 21 wherein the media server performs the step of generating media format to match the cell phone display format, protocol, and bandwidth requirements.

25. The method of claim 24 wherein the media server performs the step of delivering the IFE request as a unique individually buffered video stream for the cell phone.

26. An airborne cell phone audio/video in-flight entertainment (IFE) system for providing in-flight entertainment (IFE) and cell phone communications comprising:

a plurality of cell phones for making telephone calls and programming requests by dialing appropriate telephone numbers;

at least one pico cell for receiving the telephone calls and the programming requests from the plurality of cell phones;

a soft switch connected to the at least one pico cell and for switching the telephone calls and the IFE programming request according to the appropriate telephone number;

a transceiver connected to the soft switch and for receiving the telephone calls and sending the telephone calls to a telephone system; and a media server connected to the soft switch and for receiving the programming requests and providing programming to the plurality of cell phones, wherein the soft switch regulates data flow rate between the media server and plurality of cell phones to keep data throughput a stable rate to all cell phones.

27. The airborne cell phone audio/video IFE system of claim 26 wherein the soft switch monitors data and data streams to and from cell phones and injects audio and video messages stored in the soft switch.

28. The airborne cell phone audio/video IFE system of claim 26 wherein the plurality of cell phones become terminals for passenger control by using position location identification obtain from one of a manual entry on the cell phone keypad, use of a passenger ticket number, and use of a short range RFID tag embedded near or in a seat.

29. The airborne cell phone audio/video IFE system of claim 28 wherein the short range RF tag that is actively or passively excited by cell phones placed within its proximity.

30. The airborne cell phone audio/video IFE system of claim 29 wherein RF tag data is received by the cell phone and sent to the media server for processing lighting and environmental control commands from the cell phone to a specific aircraft seat enabling control of a light.

31. An airborne cell phone audio/video in-flight entertainment (IFE) system for providing in-flight entertainment (IFE) and cell phone communications comprising:

a plurality of cell phones for making telephone calls and programming requests by dialing appropriate telephone numbers;

at least one pico cell for receiving the telephone calls and the programming requests from the plurality of cell phones;

a soft switch connected to the at least one pico cell and for switching the telephone calls and the IFE programming request according to the appropriate telephone number;

a transceiver connected to the soft switch and for receiving the telephone calls and sending the telephone calls to a telephone system; and a media server connected to the soft switch and for receiving the programming requests and providing programming to the plurality of cell phones, wherein the soft switch monitors data and data streams to and from cell phones and injects audio and video messages stored in the soft switch and wherein the injected audio and video messages include advanced warning and priority messages to the passengers or crew.

32. The airborne cell phone audio/video IFE system of claim 31 wherein the injected audio and video messages are enabled by a position location data signal.

33. The airborne cell phone audio/video IFE system of claim 26 wherein the soft switch intercepts and scans packets from a cell phone packet transport to identify unique control words to directly control the media server.

* * * * *